United States Patent
Clouet

(10) Patent No.: US 6,712,107 B2
(45) Date of Patent: Mar. 30, 2004

(54) SUPPORTING MEMBRANE FOR A TIRE TREAD

(75) Inventor: Alain Clouet, Saint-Maurice (FR)

(73) Assignee: Michelin Recherche et Technique S.A. (CH)

( * ) Notice: Subject to any disclaimer, the term of this patent is extended or adjusted under 35 U.S.C. 154(b) by 137 days.

(21) Appl. No.: 10/191,097

(22) Filed: Jul. 9, 2002

(65) Prior Publication Data

US 2003/0000618 A1 Jan. 2, 2003

Related U.S. Application Data

(63) Continuation of application No. PCT/EP01/00649, filed on Jan. 22, 2001.

(30) Foreign Application Priority Data

Jan. 20, 2000 (FR) .............................................. 00 00814

(51) Int. Cl.$^7$ .............................. B60C 5/22; B60C 17/02
(52) U.S. Cl. .................................. 152/340.1; 152/339.1
(58) Field of Search ......................... 152/340.1, 339.1, 152/341.1, 342.1

(56) References Cited

U.S. PATENT DOCUMENTS

| 2,354,912 A | 8/1944 | Eger |
| 4,153,095 A | 5/1979 | Sarkissian |
| 6,283,185 B1 * | 9/2001 | Rivaton ............... 152/340.1 |
| 6,467,518 B1 * | 10/2002 | Clouet et al. ........... 152/340.1 |
| 6,481,481 B2 * | 11/2002 | Clouet ................. 152/340.1 |

FOREIGN PATENT DOCUMENTS

| AU | 5320498 | 6/1998 |
| AU | 1967399 A | 7/1999 |
| DE | 2520321 A1 | 11/1976 |

* cited by examiner

*Primary Examiner*—Adrienne C. Johnstone
(74) *Attorney, Agent, or Firm*—Felipe J. Farley; Christopher P. Crecente; Alan A. Csontos

(57) ABSTRACT

Toric membrane M used as a support means for the tread of a tire P and forming together with the said tire P and its mounting rim J an assembly that can roll when the tire P suffers a loss of pressure, the said membrane M being expandable, capable of filling the internal cavity of the tire P, consisting of an airtight interior layer (10), a crown reinforcement (14) comprising two crossed plies (141, 142), two carcass half-plies (111, 112) anchored in each bead B reinforced by a reinforcement ring (2) and a cap (17) reinforced by a hopping armature (16), the crown reinforcement (14) being detached from the interior layer (10) and from the edges of the carcass half-plies (111, 112) which are on either side of the equatorial plane XX' and are connected by at least one connecting ply (15).

2 Claims, 2 Drawing Sheets

SUPPORTING MEMBRANE FOR A TIRE TREAD

The present application is a continuing application of International Patent Application No. PCT/EP01/00649, filed Jan. 22, 2001, published Jul. 26, 2001 in the French language under PCT Article 21(2) as Publication No. WO 01/53120.

BACKGROUND OF THE INVENTION

The invention concerns a support means for the tread of a tire. Together with the said tire and its mounting rim, the said support means constitutes a rolling assembly for a vehicle, intended to be able to roll after a considerable and unexpected pressure loss from the tire. The said tire is more particularly a tubeless tire of the heavy-duty or civil engineering type.

French Patent Application FR 2 756 221 describes and claims as a means for supporting or holding up a tire tread, a toric membrane made of reinforced rubber, which is inflated to a pressure $p_o$ higher than the pressure $p_I$ of the tire cavity and which, in the inflated condition, has a crown radius $R_M$ smaller than the flattened radius $R_E$ of the tire used at its recommended pressure, the said membrane, at least at its crown, being reinforced by at least one ply of cords or cables, the said crown of the said membrane comprising in addition at least one hoop-like reinforcement of cords or cables orientated circumferentially and having a rupture strength per cm of ply at least equal to the product of the crown radius $R_M$ by the pressure, per $cm^2$, of the area of the said ply, leading to a tension per cm of ply equivalent to the tension due to the maximum centrifugal force to which the tire can be subjected and enabling the rupture of the hoop-like cords or cables at a pressure differential $p_o-p'_I$, which exists if the tire suffers a pressure loss greater than the initial pressure differential $p_o-p_I$, in other words when it is rolling normally. The said hoop-like reinforcement may consist of at least one layer, generally located among the crown reinforcement plies, or several strips located in recesses formed on the protective layer radially covering the underlying plies.

The internal pressure $p_o$ of the said membrane, measured cold, in other words at 20° C., is higher than the pressure $p_I$ of the internal cavity of the tire by an amount between $0.5 \times 10^5$ Pa and $5.0 \times 10^5$ Pa, depending on the dimensions of the tire concerned. Granted that the crown radius $R_M$ of the toric membrane is preferably between 0.80 and 0.97 times the flattened radius $R_E$ of the tire, mainly for reasons related to the heating of the said tire, too high a pressure difference risks altering a number of properties of the tire itself, for example the endurance of its carcass reinforcement, while also requiring too large a hoop-like reinforcement.

The crown of the said membrane is preferably reinforced by two plies of cords or cables parallel to one another in each ply and crossed from one ply to the next to make an angle with the circumferential direction between 50° and 85°. The cables or cords are advantageously textiles for reasons of lightness, flexibility and good corrosion resistance, and are preferably made of aromatic polyamide. The axial ends of the two plies are preferably located on the side walls of the membrane, such that if the maximum axial width of the tire's carcass reinforcement is denoted as S, the width of the plies is preferably between S and 1.30 S.

If the tire bursts, the pressure difference $p_o-p_I$ increases, the cables of the hoop-like ply or plies break, the toric support membrane expands inside the tire cavity, and this enables the whole to continue rolling despite the pressure drop in the tire cavity.

Thereafter, such membranes have been the subject of several improvements: the patent FR 2 772 666 concerns the introduction of annular reinforcement elements which enable the wrapping of the side wall reinforcement ply or plies, the said elements being so constituted that they can break at essentially the same pressure difference $p_o-p'_I$, consequently allowing the membrane to expand within the tire cavity. A second improvement consisted in providing the membrane side wall reinforcement ply or plies with elements formed on the one hand of a core able to rupture at a given pressure difference, and on the other hand of a cord or cable wrapped in a helix around the said core so as to allow a considerable elongation of the side reinforcement elements and thus allow expansion. The use of such cables with force-elongation curves represented essentially by two adjacent straight-line segments with different slopes, has made it possible to adopt several membrane crown reinforcement architectures, the said crown reinforcement being necessary to resist perforation of the membrane itself and being completed by the hoop-like reinforcement of circumferential reinforcing elements designed to keep the crown of the membrane in its initial position, i.e. as for normal rolling with the desired pressures in the membrane and in the tire.

The structures mentioned are not suitable for the conditions set for rolling of such an assembly when the tire cavity pressure becomes zero due to a puncture and the assembly is rolling at a reduced pressure. The resistance of the membrane to a sharp and perforating object undergoing the same rotation movement as the rolling assembly, must be very greatly improved.

BRIEF SUMMARY OF THE INVENTION

To do this, and according to the invention, the toric membrane used as a support means for the tread of a tire P and forming together with the said tire P and its mounting rim J an assembly that can roll when the tire suffers a loss of pressure, the said membrane being expandable, capable of filling the internal cavity of the tire, consisting of a cap reinforced by a hoop-like armature and connected via two side walls reinforced by a carcass reinforcement to two beads, each bead comprising at least one inextensible and strong reinforcement ring around which the carcass reinforcement is anchored by forming a turn-up, is characterized in that radially above in internal layer of rubber impermeable to the inflation gases there is a crown reinforcement of at least two plies of textile reinforcement elements crossed from one ply to the next and making with the circumferential direction angles between 40° and 75°, the said crown reinforcement being detached from the said internal layer over a meridian distance equal to its width and being radially overlaid by the edges of two carcass half-plies which extend in the side walls while being detached from the said edges, each carcass half-ply being turned up in each bead around a reinforcement ring and being formed of textile reinforcement elements orientated relative to the circumferential direction at an angle between 40° and 75°, the said edges on either side of the equatorial plane being connected radially on the outside by at least one connecting ply of textile elements, the combination of the said edges and the connecting ply being radially overlaid by a hoop-like reinforcement consisting of at least one ply of circumferential textile elements, the reinforcement elements of the hoop-like reinforcement and the elements of the connecting ply having strengths which allow them to break at a pressure differential $p_o-p'_I$ that exists in the event of pressure loss in the internal tire cavity, this being larger than the initial pressure differential $p_o-p_i$ during normal rolling.

The hoop-like reinforcement is advantageously partially detached from the combination formed by the carcass half-plies and the ply connecting the edges of the said half-plies, and this combines two advantages, on the one hand that the reinforcement elements of the hoop-like armature are not dispersed after breaking, and on the other that the crown of the support membrane is as flexible as possible.

A reinforcement (armature), ply or layer is said to be detached from a reinforcement (armature), ply or layer when the reinforcement, ply or layer does not adhere at all in the vulcanized condition to the reinforcement, ply or layer radially adjacent to it, the said absolute lack of adhesion being obtained by using an anti-adhesion product before vulcanization, for example a stearate-based solution and metallic powder.

BRIEF DESCRIPTION OF THE DRAWINGS

The characteristics of the invention will be better understood from the description below, which refers to the drawing illustrating an example embodiment in a non-limiting way. The drawing shows.

DETAILED DESCRIPTION OF THE INVENTION

Figure 1:
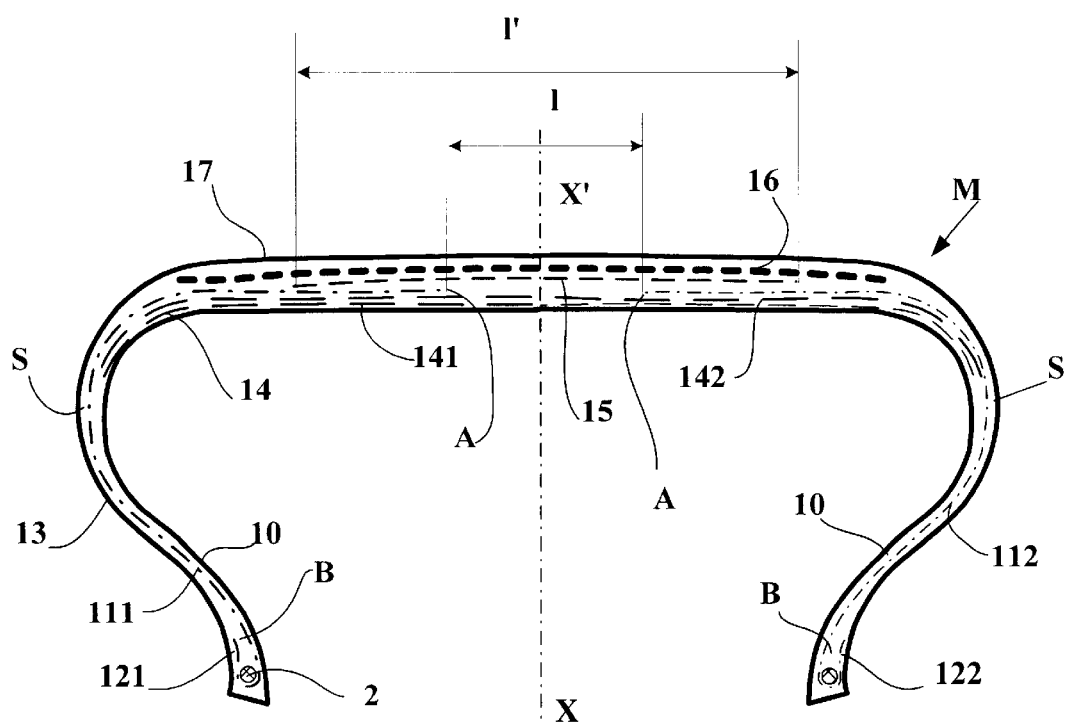
FIG. 1: Schematic representation of a toric support membrane according to the invention

The support membrane M according to the invention comprises a cap 17 connected via two side walls 13 to two beads B on either side of the equatorial plane XX'. The said membrane M is closed and has on the inside a layer of rubber mix 10 based on halogenated elastomer, this layer being impermeable to the inflation gases generally used in the tire industry. During the building of the membrane, the said layer 10 is covered uniformly and by appropriate means with a wash-coat of stearate-based parting agent, a product known for its anti-adhesion effect in the vulcanized state, the said coverage extending over a meridian length essentially equal to the length between the two points S of the membrane between which the maximum internal axial width parallel to the rotation axis of the rolling assembly is measured. Over the crown of the membrane and on the said wash-coated internal layer 10 is positioned a crown reinforcement 14 consisting of two plies 141 and 142 of polyester cables imbedded in an appropriate rubber mix liner, the cables being parallel to one another within each ply and crossed from one ply 141 to the next 142, making with the circumferential direction angles $\alpha$, $\alpha'$ equal to 60°. That is to say, each cable or cord in the ply intersects with a line in the circumferential direction, where for convenience the acute angles (cord angles) formed might be designated "alpha" for one ply, "alpha prime" for a second ply, "alpha triple prime" for a third ply, and so on. It is understood that the angles $\alpha$ and $\alpha'$ may be unequal and can range between 40° and 75° without departing from the scope of the invention. The two plies 141 and 142 have axial widths essentially equal to one another and smaller than the wash-coated meridian length, such that the said two plies 141 and 142 are completely detached from the gas-tight internal layer 10. Over their axial width the said plies 141 and 142 are covered radially with the same anti-adhesion wash-coat as that used on the internal layer, which confers upon the crown reinforcement the property of being absolutely free on the inside of the membrane M itself.

The carcass reinforcement 11 is formed of two half-plies 111 and 112, these being anchored in each bead by wrapping around an annular reinforcement element 2 for turn-ups 121 and 122. Each annular reinforcement element 2 is formed by wrapping 167×2 cables made of aromatic polyamide. Such a composition confers upon the said annular element almost perfect extensibility and a breaking strength at least equal to 1.05 times the necessary strength induced by the tension exerted upon the annular element by the reinforcement elements of the side wall ply: thus, under the conditions described the annular element 2 can be regarded as inextensible and unbreakable. The said annular element, which ensures gas-tightness between the membrane and the tire, is positioned radially as close as possible to the mounting rim of the tire and, in the case illustrated, its inside diameter is between the nominal diameter $D_5$ of the rim and the value $D_5$ reduced by the product $L_s \times tg\delta$, where $L_s$ is the axial width of the tire seat and $tg\delta$ is the tangent of the angle of inclination of the mounting rim seat.

On the shoulders and over most of the membrane's crown, the half-plies 111 and 112 cover radially the two crown reinforcement plies 141 and 142 while being detached, radially above the points S of maximum axial width, from the said plies 141 and 142 by a layer of anti-adhesion product. The said half-plies 111 and 112 have ends A located on either side of the equatorial plane XX', and radially below the two points S are perfectly attached to the internal layer 10. The half-plies 111 and 112 are formed of aromatic polyamide cables parallel to one another and inclined relative to the circumferential direction by the same angle $\alpha$ (same direction and value) in each half-ply as that of the crown ply 142 radially furthest away from the rotation axis. The two edges of the two half-plies 111 and 112 are axially connected by a connecting ply 15 which extends either side of the equatorial plane XX' with an axial width l' essentially equal to 5 times the axial width l separating the two ends of the half-plies 111 and 112, the width l being between 3% and 8% of the maximum internal axial width. The said connecting ply 15 is formed of rayon cords that make with the circumferential direction an angle whose value is between the angle $\alpha$ of the cables of the two half-plies 111 and 112 and 90°. Between the upper face of the ply 142 and the connecting ply 15, the same anti-adhesion wash-coat is applied as that which prevents adhesion of the half-plies 111 and 112 to the ply 142, so that the ply 15 is detached from the crown reinforcement formed by the plies 141, 142 over the axial width l'. A hoop-like armature, consisting in the case considered of a single ply 16 of circumferential, aromatic polyamide reinforcement elements, in other words elements that make an angle of 0°±2.5° with the circumferential direction, is also detached from the two half-plies 111, 112 and from the ply 15 by an anti-adhesion wash-coat. The hoop-like ply 16 and the connecting ply 15 hold the membrane M in on the one hand against stresses due to the centrifugal force to which the crown of the membrane is subjected when the rolling assembly is rotating, and on the other hand against the stresses due to the pressure differential $p_o-p_i$, where $p_o$ is the inflation pressure of the toric membrane M, for example equal to $10\times10^5$ Pa, which is higher than the pressure $p_i$ of the tire, for example equal to $9.0\times10^5$ Pa. The hoop-like function enables the membrane M and its crown, under normal rolling conditions of the rolling assembly, that is to say under the conditions of loading, pressure and speed recommended for the tire concerned, to maintain a membrane crown radius defined as the radius of the membrane point furthest away from the rotation axis measured in the equatorial plane, which is practically constant and smaller than the flattened radius of the tire under normal rolling conditions.

In contrast, the nature and structure of the reinforcement elements of the hoop-like ply 16 and the connecting ply 15 are chosen such that they can break at a pressure differential $p_o-p'_l$, which exists in the event that the tire loses pressure, where $P'_l$ is then less than $p_l$ and the differential $p_o-p'_l$ is accordingly larger than $p_o-p_l$.

Figure 2:
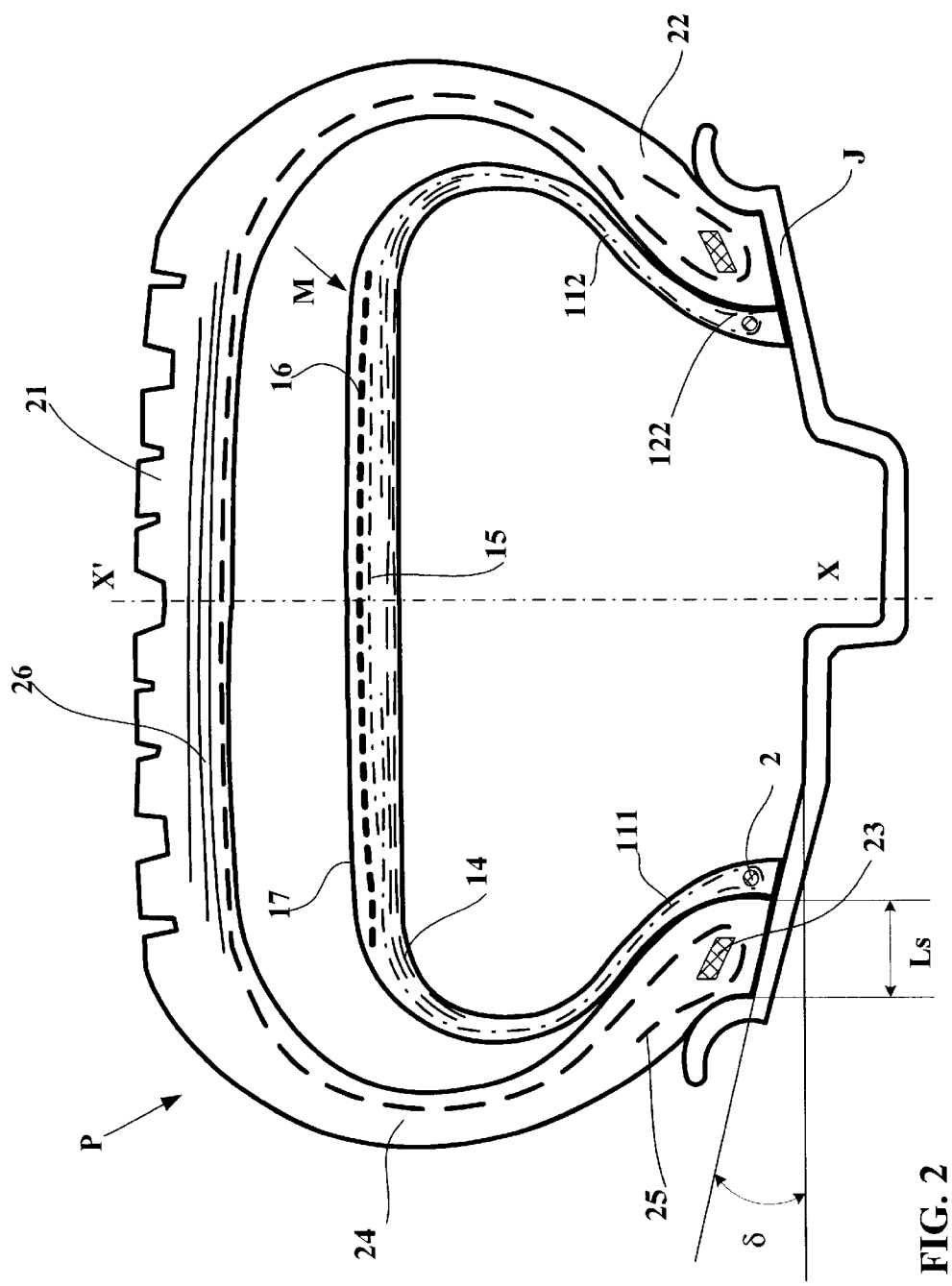
FIG. 2: Schematic representation of the membrane of FIG. 1 in position in the tire fitted to its working rim and inflated

In FIG. 2 the assembly E consists of the tire P of size 495/45-R-22.5 in the example described, the mounting rim J, and the toric membrane M according to the invention. The tire P is a universally known tire with side walls connected radially on the outside to a tire tread 21 and extending radially on the inside as far as two beads 22, each bead 22 being reinforced by at least one bead wire 23 around which is anchored a radial carcass reinforcement 24 by forming turn-ups 25. At its crown the said carcass reinforcement 24 is covered radially by a crown reinforcement 26 consisting of at least two plies of metallic wires or cables parallel to one another within each ply and crossed from one ply to the next, which make with the circumferential direction an angle that can range from 5° to 45°. The tire P is known as a tubeless tire and comprises on the inside a layer of rubber mix impermeable to the inflation gases.

The membrane structure described above is capable not only of expanding fully if the tire bursts and deflates, and so essentially preserving the shape of the said tire but without giving rise to any internal deterioration of the tire during the phases of normal rolling, but also of allowing rolling to continue, with the perforating element wedged in the tire and projecting beyond the inside wall by a distance essentially equal to 30 mm, for a distance of at least 60 km at an internal pressure of the rolling assembly equal to the lower pressure existing after the membrane has expanded, until the vehicle reaches an inflation station, and rolling on after re-inflation to the nominal pressure, with the perforating object still in place, for a distance of at least 500 km, a distance sufficient to find a tire repair workshop.

What is claimed is:

1. A toric membrane M used as a support means for the tread of a tire P and forming together with the said tire P and its mounting run J an assembly that can roll when the tire P suffers a loss of inflation pressure, the said membrane M being expandable, capable of filling the internal cavity of the tire P, consisting of a cap reinforced by a hoop-like armature and connected via two side walls reinforced by a carcass reinforcement to two beads B, each bead B comprising at least one inextensible and strong reinforcement ring around which the carcass reinforcement is turned up to anchor it, the toric membrane M characterized in that radially above an internal rubber layer impermeable to the inflation gases there is a crown reinforcement of at least two plies of textile elements, crossed from one ply to the next and making with the circumferential direction angles between 40° and 75°, the said crown reinforcement being detached from the said internal layer over a meridian distance equal to its width and being radially overlaid by the edges of two carcass half-plies which extend in the side walls while being detached from the said edges, each carcass half-ply being formed of textile reinforcement elements orientated relative to the circumferential direction at an angle between 40° and 75°, the said edges on either side of the equatorial plane XX' being connected by at least one connecting ply of textile elements, the assembly of the said edges and the at least one connecting ply being overlaid by a hoop-like armature composed of at least one ply of circumferential textile elements, the reinforcement elements of the hoop-like armature and those of the at least one connecting ply have strengths which enable them to break at a pressure differential $p_0-p'_1$ present in the event of pressure loss from the internal cavity of the tire, the said pressure differential being larger than the pressure differential $p_0-p'_1$ present during normal rolling.

2. A toric membrane according to claim 1, characterized in that the hoop-like armature is partially detached from the assembly formed by the carcass half-plies and the at least one ply connecting the edges of the said half-plies.

* * * * *